US007334674B2

(12) United States Patent
Berndtsson et al.

(10) Patent No.: US 7,334,674 B2

(45) Date of Patent: Feb. 26, 2008

(54) APPARATUS FOR HANDLING INFORMATION CARRIERS

(75) Inventors: Anders Berndtsson, Stein am Rhein (CH); Hans Wyssmann, Zurich (CH)

(73) Assignee: Atlantic Zeiser GmbH, Emmingen (DE)

( * ) Notice: Subject to any disclaimer, the term of this patent is extended or adjusted under 35 U.S.C. 154(b) by 0 days.

(21) Appl. No.: 11/515,021

(22) Filed: Sep. 1, 2006

(65) Prior Publication Data

US 2007/0114109 A1 May 24, 2007

(30) Foreign Application Priority Data

Nov. 19, 2005 (EP) ................................. 05025313

(51) Int. Cl.
*B65G 17/46* (2006.01)

(52) U.S. Cl. ................................ 198/471.1; 198/478.1

(58) Field of Classification Search ............ 198/469.1, 198/470.1, 471.1, 472.1, 478.1

See application file for complete search history.

(56) References Cited

U.S. PATENT DOCUMENTS 3,556,898 A * 1/1971 Allen ......................... 156/384
3,574,026 A * 4/1971 Kucheck ..................... 156/152
4,111,121 A * 9/1978 Borum ....................... 101/227
4,408,906 A 10/1983 Wallace et al.
6,969,134 B2 * 11/2005 Hohberger et al. ............ 347/2
2003/0227528 A1 12/2003 Hohberger et al.

FOREIGN PATENT DOCUMENTS

EP 1 072 520 1/2001

* cited by examiner

*Primary Examiner*—James R. Bidwell
(74) *Attorney, Agent, or Firm*—Michael J. Striker

(57) ABSTRACT

An apparatus for handling information carriers has at least one longitudinally movable striplike belt which holds information carriers detachably and successively, and at least one device for detaching at least some information carriers from the belt, removing selected information carriers from the detached information carriers, and transferring other information carriers from the detached information carriers back onto the belt for being transported onwards.

50 Claims, 3 Drawing Sheets

APPARATUS FOR HANDLING INFORMATION CARRIERS

CROSS-REFERENCE TO A RELATED APPLICATION

The invention described and claimed hereinbelow is also described in European Patent Application 05025313.7 filed on Nov. 19, 2005. This German Patent Application, whose subject matter is incorporated here by reference, provides the basis for a claim of priority of invention under 35 U.S.C. 119(a)-(d).

BACKGROUND OF THE INVENTION

The invention relates to an apparatus for handling information carriers.

Such information carriers involve for instance RFID labels, that is, substrates provided with an adhesive side on the back, which are equipped with integrated circuits that have contacts, or instead with integrated circuits that are contactless and provided with antennas, and which are detachably held and transported with the adhesive side on a striplike belt. In handling such information carriers, the problem arises for instance of removing information carriers from the belt that have been found nonfunctional, for instance, and separating them out. This must be done by machine as continuously as possible and at high speed.

SUMMARY OF THE INVENTION

Accordingly, it is an object of the present invention to provide an apparatus for handling information carriers, which is a further improvement of the existing apparatuses.

More particularly it is an object of the present invention to create an apparatus for handling information carriers of the type defined at the outset which makes it possible for selected information carriers, especially those found nonfunctional, during belt travel which is done continuously and at high speed, to be removed reliably and quickly from the belt, without damage to the belt and the information carriers and without having to interrupt the continuous travel.

In keeping with these objects and with others which will become apparent hereinafter, one feature of the present invention resides, briefly stated, in an apparatus for handling information carriers, comprising at least one longitudinally movable striplike belt which holds information carriers detachably and successively; and at least one device for detaching at least some information carriers from said belt, removing selected information carriers from the detached information carriers, and transferring other information carriers from the detached information carriers back onto said belt for being transported onwards.

The design according to the invention of the apparatus makes it possible, during continuous travel of the belt provided with information carriers and at a high travel speed, to sort out information carriers found to be nonfunctional and remove them quickly and reliably, without damage to the belt, which might be so extensive as to tear it apart.

The apparatus is simple and functionally reliable, and among other things it also creates the prerequisites for pressing those information carriers that need not be sorted out but that have initially been detached from the belt, at least in part with some surface regions or even entirely, to be pressed back against the belt and thus for the adhesive holding to be restored.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 2:
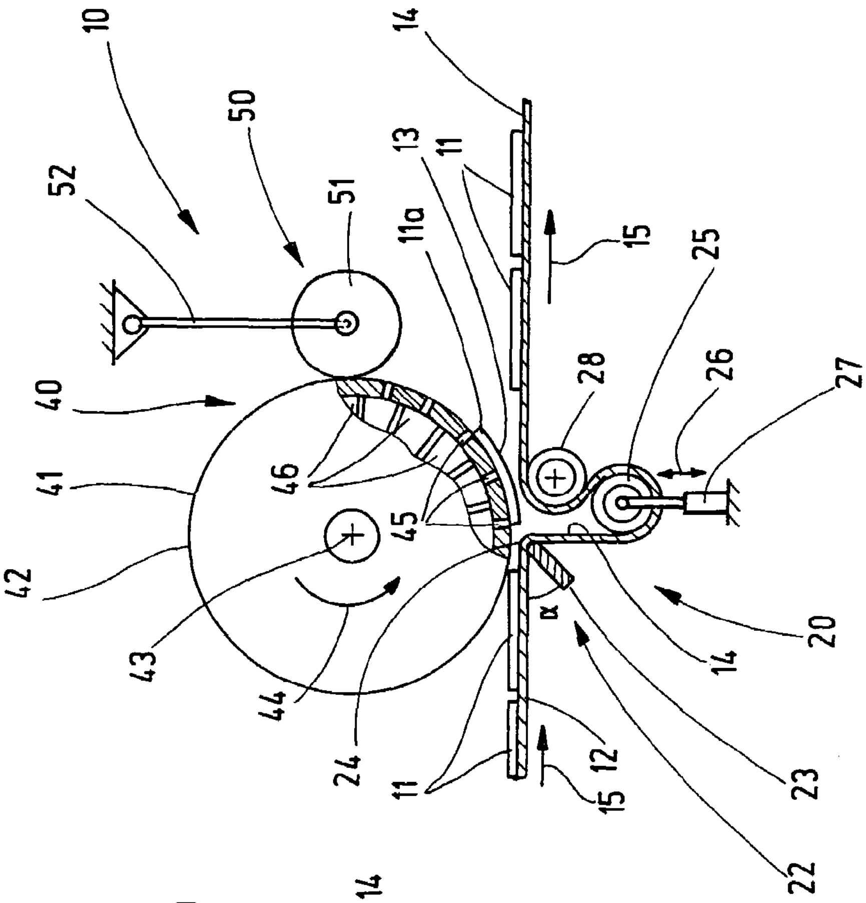
FIG. 2 is a schematic side view, partly in section, of the apparatus in FIG. 1, in a second phase of operation.
Figure 1:
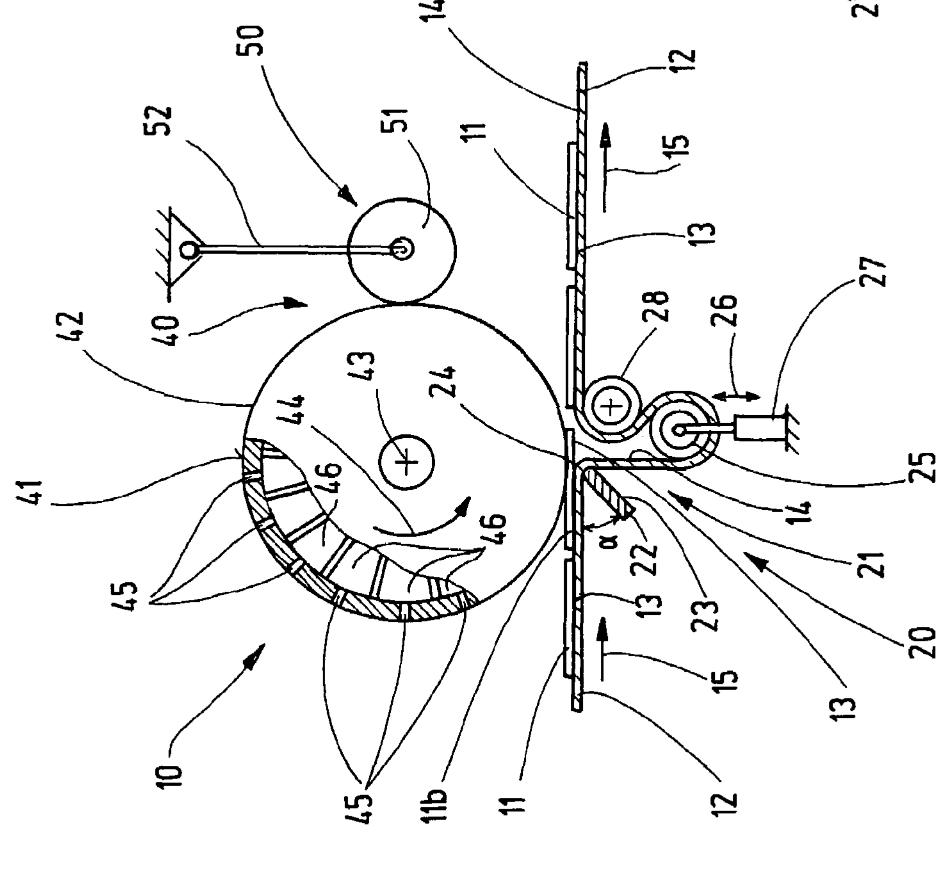
FIG. 1 is a schematic side view, partly in section, of an apparatus for handling information carriers in a first exemplary embodiment and in one phase of operation.

In FIGS. 1 and 2, a first exemplary embodiment of an apparatus 10 is shown which is embodied for handling information carriers 11 that are transported in succession, for example with spacings between them, on at least one longitudinally moved striplike belt 12. These information carriers 11 are for instance RFID labels, such as labels, tickets or the like, especially those that are embodied as substrates with integrated circuits. The integrated circuits may typically have contacts, or they are contactless and provided with antennas, so that a contactless exchange of information with these information carriers 11 is possible. Each substrate, bearing an integrated circuit, of the information carrier 11 has an adhesive side 13 on the back and is held detachably by it on the top side 14 of the belt 12, for instance by adhesive bonding.

In these information carriers 11 transported by means of the belt 12, the problem exists of separating those information carriers 11 from the belt 12 that have been found, on the basis of a test performed, to be defective and in particular nonfunctional, and removing them. There is a need for this to be done, during continuous high-speed travel of the belt 12 with information carriers 11 on it, in such a way that the belt is not damaged and in particular does not tear.

These demands are met to a high degree by the apparatus 10 according to the invention, and with a simple and functionally reliable design. The apparatus 10 is characterized according to the invention by at least one device 20 by means of which at least some selected information carriers 11 are at least partly or entirely detachable from the belt 12, which is moved progressively continuously in the direction of the arrow 15, or in other words from left to right in FIGS. 1 and 2. By means of the device 20, of these information carriers 11 that have been entirely or partly detached, selective information carriers, as illustrated taking the example of the information carrier 11*a* in FIG. 2, in particular information carriers 11*a* found to be nonfunctional, are removable, while the other information carriers 11 that have been at least partly or entirely detached can be transferred back onto the belt 12 so as to be transported onward in the direction of the arrow 15.

The device 20 has a deflector 21, which deflects the belt out of its level and course and then, at a spacing from this that is adjustable and under some circumstances can be very slight returns it to its level again. This process is shown clearly in FIG. 1 for the information carrier marked 11*b* there, which as a result of a deflection of the belt 12 is already detached from the top side 14 of the belt 12 because of the belt deflection by a front portion in terms of the travel direction of the belt 12 and in this portion is exposed with its adhesive side 13 on the underside and no longer has any connection with the belt 12.

Figure 3:
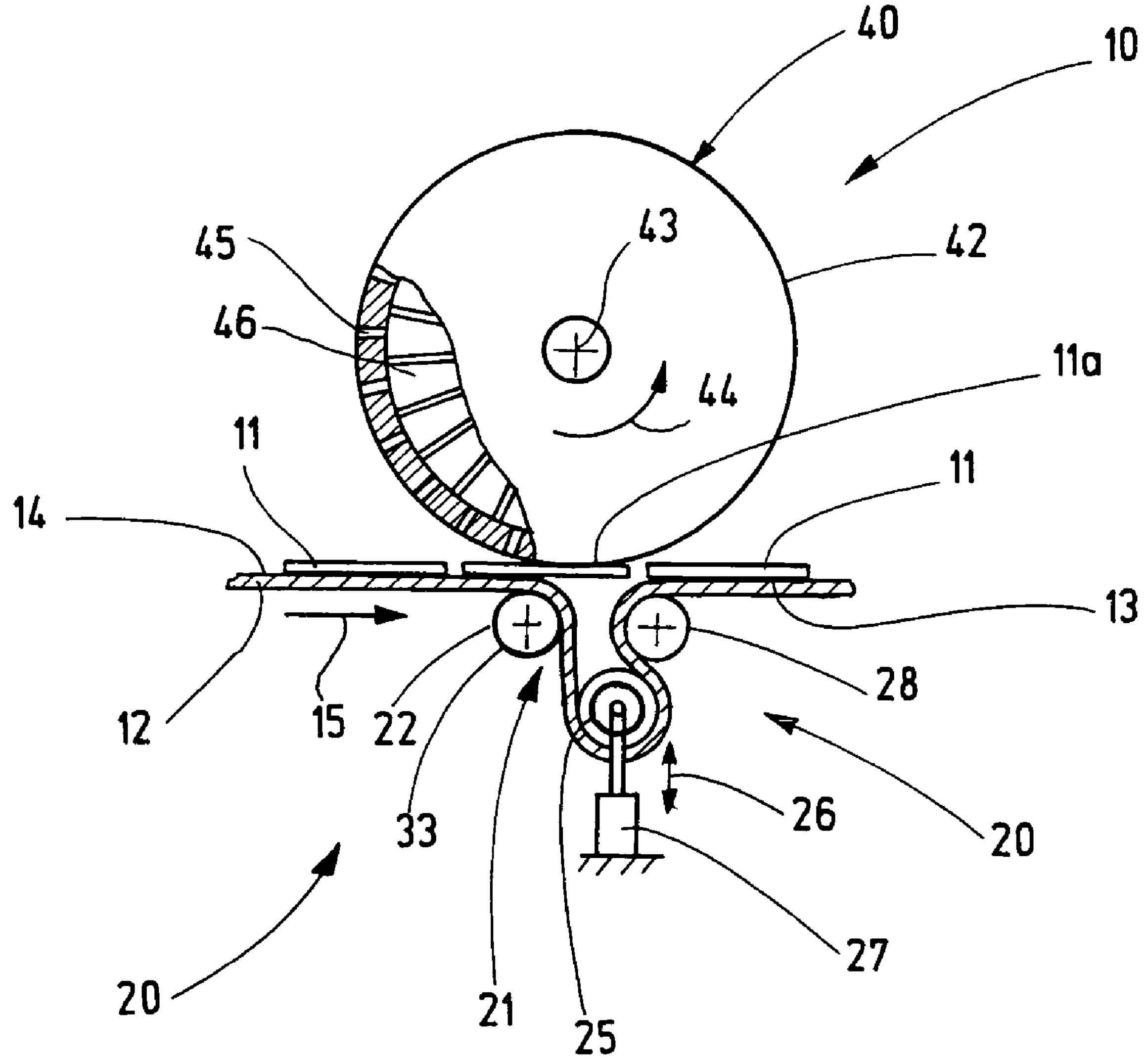
FIG. 3 is a schematic side view, partly in section, approximately corresponding to that of FIG. 1, of an apparatus for handling information carriers, in a second exemplary embodiment.

The deflector 21 has a deflection member 22, which in the first exemplary embodiment is formed of a slide body 23 and conversely in the second exemplary embodiment of FIG. 3 is formed of a roller body 33, in particular in the form of a deflection roller. The deflection member 22 in the first exemplary embodiment, in the form of the slide body 23 there, is formed for example of a deflection edge 24, such as a rib edge or knife edge. The slide body 23 that is for example in the form of a strut or a knife extends relative to the plane of the belt 12 at an angle $\alpha$ to it, and this angle may for instance be approximately 45°.

The deflector 21 also, viewed along the deflected belt course, at a spacing from the deflection member 22 has at least a first deflection body 25, which in particular is embodied as a deflection roller. This first deflection body 25 is placed relative to the deflection member 22 and the belt course such that by means of the deflection member 22, the belt 12 can be deflected out of the belt level and belt course at the deflection edge 24 by such a sufficient angle, which here is about 90°, that as a consequence of this belt deflection, the belt 12, in the region of the deflection edge 24, distances itself from the individual information carriers 11, as shown for information carrier 11*b* in FIG. 1. This causes detachment of the information carriers 11*b*, whereupon the information carriers 11, such as the information carrier 11*b*, stay at least substantially at the belt level.

The detached information carriers 11 accordingly do not go along with the deflection of the belt 12, which after all is performed precisely in order to bring about a detachment of the individual information carriers 11, with the adhesive side 13 on the underside, from the top side 14 of the belt 12 in an automatic way. This detachment is shown in FIG. 1 for the information carrier 11*b*, specifically its front portion, which is detached from the belt 12 but stays essentially at the belt level.

The spacing between the deflection member 22 and the first deflection body 25, in particular the deflection roller, is variable and adjustable. For this purpose, the first deflection body 25 is adjustable in terms of its spacing from the deflection member 22, which is indicated by the arrow 26 and by an adjusting device 27, for instance in the form of an adjusting cylinder.

The deflector 21 has a second deflection body 28, which is for instance also embodied as a deflection roller, and which is adjacent to the deflection member 22 and returns the belt 12 to its level and course. The second deflection body 28 can be adjustable together with the belt 12 out of the belt level and belt course, particularly in a direction that is facing away from the first deflection body 25, or in other words upward in terms of FIGS. 1 and 2. Because of the disposition of the second deflection body 28, the belt 12 as thus again extends at its original level a result of deflection. As a result, it is attained that the particular information carrier 11*b* that was detached from the top side 14 of the belt 12 by deflection of the belt 12 by means of the deflection member 22 then again, because of the forward travel by the belt 12 then again, with the adhesive side 13 on its underside, reaches the belt 12 that has been deflected by the second deflection body 28 and returned to its level, and the adhesive bond is restored by means of the adhesive side 13.

Thus after detachment from the belt 12 the information carrier 11*b* that is not selected, and that in particular is found to be nonfunctional, arrives again, by deflection of the belt, with its adhesive side 13 on the top side 14 of the belt 12 and adheres to it again by adhesive action. It has merely changed places on the belt 12. The change in place can be adjusted by adjusting of the first deflection body 25 in the direction of the arrow 26.

Conversely, if an information carrier 11*a* (FIG. 2) is selected as one to be removed from the belt 12 and rejected, for example for being nonfunctional, then this information carrier 11*a* that is to be separated out, unlike the information carrier 11*b*, is removed so that it does not return to the top side 14 of the belt 12 and enter into an adhesive bond with it. For that purpose, the device 20 has a removal device 40, for removing individual information carriers 11*a* that have been removed from the belt 12.

The removal device 40 is designed such that by means of it, at least information carriers 11*a*, or those selected without exception and in particular those found nonfunctional, from which the belt 12 has distanced itself because of belt deflection, are picked up and carried out of the region of the belt 12. The removal device 40 has a suction and/or pressure device 41 for subjecting the information carriers 11 to suction/pressure and carrying defective information carriers 11, for instance, away. This suction and/or pressure device 41 has at least one drum 42, which is continuously or intermittently drivable to rotate about an axis 43 by means of a drive mechanism, not further shown, in a direction of rotation indicated by the arrow 44. The drum 42 is adjacent to the belt 12, specifically in such a way that a circumferential portion is located approximately in the region of the deflection member 22, or between the deflection member 22 and the second deflection body 28.

The direction of rotation of the driven drum 42 indicated by arrow 44 corresponds to the belt travel direction indicated by arrow 15, or in other words is counterclockwise. The drum 42 can preferably be driven at an rpm that matches the travel speed of the belt 12. On its circumferential surface, the drum 42 has openings 45, which communicate with respective chambers 46. The chambers 46 are in turn subjected, from a source not further shown, to gas, in particular air, and this medium, as needed, is at underpressure for imposing suction or at overpressure for imposing pressure. As a result, it can be attained that via the drum 42 and its openings 45, by means of subjection to gas, in particular air, it is possible to subject individual information carriers 11 to suction and/or pressure.

By subjecting at least one chamber 46 and at least one opening 45 communicating with it to underpressure in the corresponding circumferential region of the drum 42, an information carrier 11*a* which has been found defective and is thus to be removed and which because of the deflection of the belt 12 is detached with its adhesive side 13, at least in a front region, from the belt 12 is picked up by suction action by the drum 42 and removed from the region of the belt 12. This is shown clearly in FIG. 2 for one such information carrier 11*a*.

In the first exemplary embodiment, the drum 42 has a nondeformable circumference, with openings 45 distributed on it in the circumferential direction. The drum 42 may be embodied solely for subjecting individual information carriers 11_a_ to suction and aspirating them. In that case, this removal device 40, in particular the drum 42, will for example be activated and supplied with underpressure only whenever a signal for removal by suction of an information carrier 11_a_ found to be defective is furnished by a test device, and on the basis of that at least those chambers 46 and openings 45 communicating with them that are located in the region of the information carrier 11_a_, already separated from the belt 12 by its front portion, and to be removed by suction are subjected to underpressure.

That is, if the information carrier 11_b_ in FIG. 1 has been found to be in need of removal, then the lower region of the drum 42, with chambers 46 and openings 45 located there, is subjected to underpressure for removing the information carrier 11_b_ by suction, at least in its front portion that is free of the belt 12. By further rotation of the drum 42 in the direction of the arrow 44, as the information carrier 11_b_ is progressively detached further from the belt 12, the region of the information carrier 11_b_ that follows the front portion is then also picked up by suction by the drum 42 and removed from the region of the belt 12. This is shown in FIG. 2 for one such information carrier 11_a_.

In the first exemplary embodiment, the drum 52 has a nondeformable circumference, with openings 45 distributed in the circumferential direction. The drum 42 may be embodied merely for subjecting individual information carriers 11_a_ to suction and aspirating them. In that case, this removal device, especially the drum 42, is activated and subjected to underpressure for example only whenever a testing device furnishes a signal accordingly that an information carrier 11_a_ found to be damaged should be removed by suction. On the basis of this, at least those chambers 46 and openings 45 communicating with them and located in the region of the information carrier 11_a_ that has already been separated by its from portion from the belt 12 are subjected to underpressure.

For instance, if the information carrier 11_b_ in FIG. 1 has been found to require removal, then the lower region of the drum 42 with the chambers 46 and openings 45 there is subjected to underpressure, for removing the information carrier 11_b_, initially by its front portion that is free of the belt 12. By further rotation of the drum 42 in the direction of the arrow 44, with further progressive detachment of the information carrier 11_b_ from the belt 12, the region of the information carrier 11_b_ that follows the front portion is them also picked up by suction by the drum 42, resulting in the situation shown in FIG. 2 for the information carrier 11_a_ shown there.

The removal device 40 in this form also makes it possible for information carriers 11, detached one after the other from the belt 12, each to be aspirated by subjection to underpressure at the circumference of the drum 42 and initially moved out of the region of the belt 12 so that then, upon further revolution of the drum 42, by suitable triggering of individual openings 45 and chambers 46 communicating with them, information carriers 11_a_ found for instance to be defective can be blown off by overpressure in the direction of a collection point. Other information carriers 11 adhering by suction to the circumference of the drum 42, are transferred back onto the belt 12, as the drum revolves and as they reach the belt, for instance by means of subjection to overpressure through the openings 45 and chambers 46. With this transfer, the subjection of pressure can have a further reinforcing effect, such that as a result, the particular information carrier 11 is pressed with its adhesive side 13 on the underside against the top side 14 of the belt 12.

The removal device 40, even if it is embodied only for subjecting defective information carriers 11_a_ to suction and aspirating them, can also be used in such a way that those information carriers 11_b_ which have initially been detached by their surface regions, such as their front portion, from the belt 12 but are not to be removed, like those that have been found defective, and instead are meant to stay at the level of the belt 12 and be transferred back onto the belt 12, if at all possible without changing places, for being carried onward can be pressed against the belt 12 by means of the drum 42.

By exertion of pressure on the openings 45 of the region of the drum that is located at the level of what in FIG. 1 is the exposed, front surface region of the information carrier 11_b_, the latter can, on being transported onward, thus be pressed with its adhesive side 13 against the top side 14 of the belt 12. It stays at the belt level. Any change in its place on the belt 12 can be avoided here. The device 20, in particular the removal device 40, thus opens up this possibility as well as needed.

A receiving device 50, schematically indicated in FIGS. 1 and 2, is associated with the removal device 40, in particular the drum 42, and those information carriers 11_a_ (FIG. 2) that have been picked up, in particular aspirated, by the removal device 40 are transferred to it. This receiving device 50 has a cylinder 51, for instance comprising paper, cardboard, or the like, which is retained by means of a mount 52 and is pressed on its circumference against the circumference of the drum 42. The cylinder 51, viewed in the direction of the arrow 44, is located at the circumferential spacing of the circumferential region of the drum 42 located adjacent to the deflector 21, for instance, at the spacing of a circumferential angle of approximately 90°.

As the drum 42 revolves, the information carrier 11_a_ adhering to it and transported away by it is transferred to the cylinder 51, and the information carrier 11_a_ adheres by adhesive bonding, with its adhesive side 13 on the back, to the circumferential surface of the cylinder 51. The cylinder 51 is pressed against the circumferential surface of the drum 42, and as the number of information carriers 11_a_ adhering to the cylinder 51 increases, the circumference of the cylinder grows. Once the cylinder 51 has reached a certain diameter, it can be removed and replaced with a new one.

By removal of selected information carriers 11_a_ from the belt 12, in particular those found to be nonfunctional, gaps are created on the belt. These gaps can later be filled by functional information carriers 11 additionally applied to it, resulting then in a belt 12 with successive functional information carriers 11.

In the second exemplary embodiment shown in FIG. 3, the same reference numerals are used for those elements that correspond to the first exemplary embodiment, and so for them, reference is made to the description of the first exemplary embodiment. The second exemplary embodiment differs from the first solely in that as the deflection member 22, instead of a slide body 23, a roller body 33, for instance in the form of a deflection roller, is provided.

Figure 5:
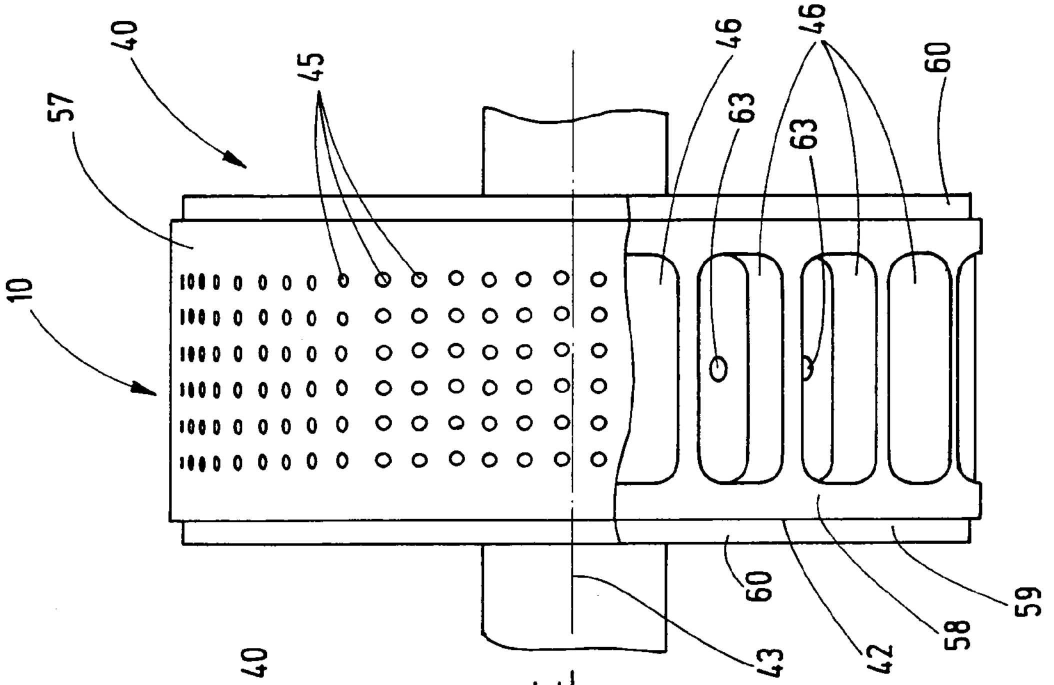
FIG. 5 is a schematic side view of the part of the apparatus in the direction of the arrow V in FIG. 4.
Figure 4:
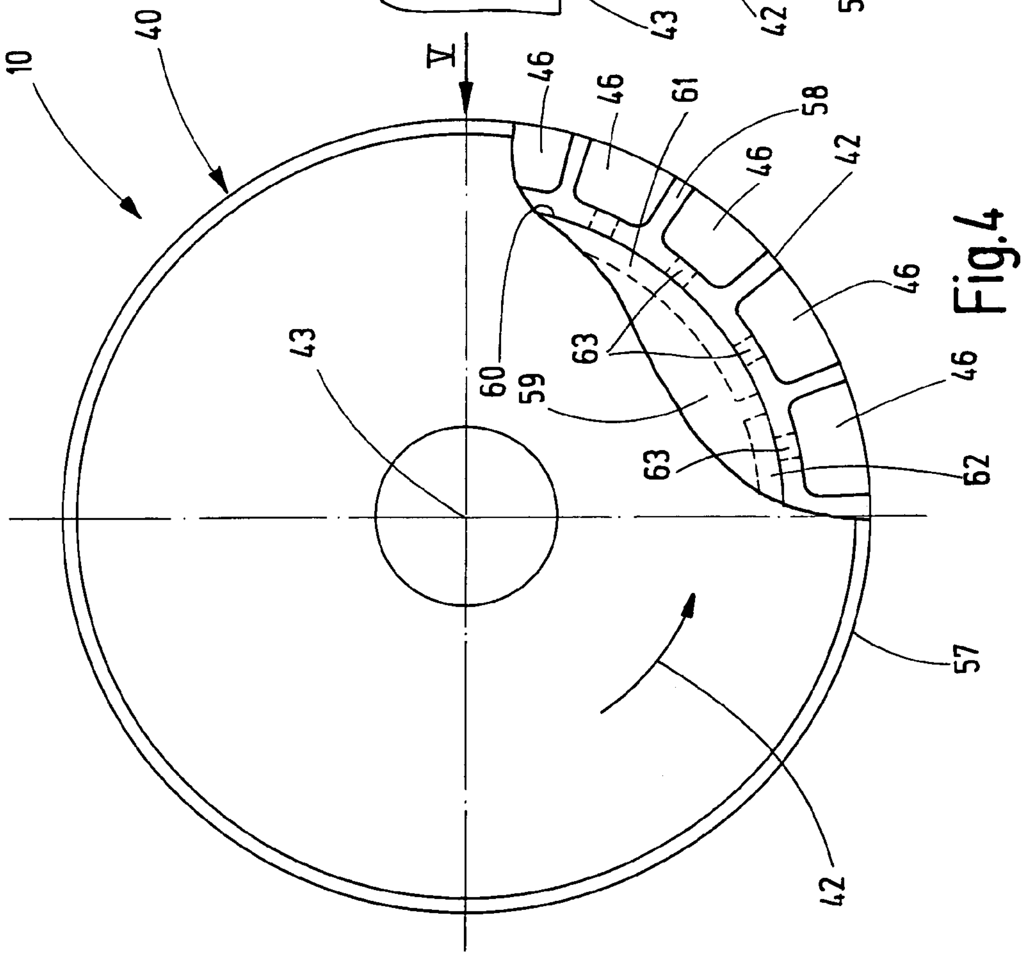
FIG. 4 is a schematic side view, partly cut away, of a part of an apparatus for handling information carriers, in a third exemplary embodiment.

In the third exemplary embodiment shown in FIGS. 4 and 5, for the same reasons, the same reference numerals as in FIGS. 1 through 3 are likewise used for identical elements.

The drum 42 shown in FIGS. 4 and 5 has a perforated flexible covering, such as a membrane over at least a circumferential portion or, as shown here, over its entire circumference. In this exemplary embodiment, the drum 42 is embodied as needed for both subjection to underpressure and aspiration of any information carriers 11 that are to be removed and for subjection to overpressure and pressing of those information carriers 11 that have detached from the belt 12 but are not to be removed but are instead to be pressed back onto the belt 12 against the belt 12 by means of the flexible covering 57. Here, the drum 42 is embodied as a ring 58 that is driven to revolve and is retained and guided on a fixed supporting part 59. This supporting part 59 has a cylindrical circumferential surface 60 and in it circumferential conduits, for instance two circumferential conduits 61 and 62 (FIG. 4), with which the chambers 46 of the ring 58 are in communication via conduits 63.

The conduits 63 are each open to the respective circumferential conduit 61 and 62. Via the circumferential conduits 61, 62, conduits 63 and chambers 46, the flexible covering 57 can be subjected to underpressure for removal by suction through the openings 45 and/or to overpressure to cause the flexible covering 57 to bulge at least slightly. For this purpose the circumferential conduits 61, 62 are in communication, or it can be brought into communication as needed, with a source of underpressure or overpressure, not further shown.

The arrangement may be made such that a circumferential conduit, for instance the circumferential conduit 61, which extends over the greatest proportion of the circumference of the supporting part 59, for instance over approximately 90° of the circumference, is subjected only to underpressure for aspirating various information carriers 11. Another circumferential conduit, such as the circumferential conduit 62, can then extend over the remainder of that proportion of the circumference of the supporting part 59 and can be selectively subjected to underpressure for aspirating various information carriers 11 or to overpressure for pressing various information carriers 11 against the belt 12 through the covering 57.

In this embodiment of the removal device 40 as well, a mode of operation is possible in which all the information carriers 11 are removed by suction one after the other. Those information carriers 11 that are good or in other words functional can then, as the drum 42 revolves and as they reach the belt 12 again, be transferred from the drum 42 again by subjection to overpressure and transferred to the belt 12 by contact pressure.

The transfer of information carriers 11 to the belt 12 can also be accomplished or at least reinforced by providing that the second deflection body 28 in FIGS. 1 through 3 is moved, together with the belt 12 guided above it, upward in the direction of the drum 42, and as a result the belt 12 is pressed against the circumference of the drum.

The removal device 40 of FIGS. 4 and 5 can also be driven in such a way that the large circumferential conduit 61 is subjected to underpressure, so that as the drum 42 in the form of the ring 58 revolves, its chambers 46 each coming into communication with this circumferential conduit 51, and as a result the openings 45 in the flexible covering 57 that are located there, are subjected only to underpressure, for aspirating defective information carriers 11*a*, for example. The other, smaller circumferential conduit 62, conversely, can be subjected to underpressure or overpressure selectively; in the case of underpressure, aspiration of information carriers is done, while in the case of overpressure, information carriers can be pressed against the belt 12 as a result of the flexibility of the covering 57 and its being caused to bulge out.

It will be understood that each of the elements described above, or two or more together, may also find a useful application in other types of constructions differing from the types described above.

While the invention has been illustrated and described as embodied in an apparatus for handling information carriers, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

The invention claimed is:

1. An apparatus for handling information carriers, comprising at least one longitudinally striplike belt which holds information carriers detachably and successively; and at least one device for detaching at least some information carriers from said belt, removing selected information carriers from the detached information carriers, and transferring other information carriers from the detached information carriers back onto said belt for being transported onwards, wherein said device is configured so that information carriers which are not intended for detachment and removal, are left with at least some surface regions on said belt along with remaining surface regions that have been detached from said belt.

2. An apparatus as defined in claim 1, wherein said device is configured so that all the information carriers are detachable from said belt.

3. An apparatus as defined in claim 2, wherein said device is configured so that all information carriers are detachable from said belt one after the other and individually.

4. An apparatus as defined in claim 1, wherein said device has a deflector which deflects said belt out of its level and course and then at a spacing from that returns said belt to its level again.

5. An apparatus as defined in claim 4, wherein said deflector has a deflection member which deflects said belt out of the belt level and belt course by an angle that is sufficient such that as a consequence of a belt deflection, said belt distances itself from the information carriers, at least partly detaching them, while the information carriers stay essentially at the belt level.

6. An apparatus as defined in claim 5, wherein said deflection member is configured as a member selected from the group consisting of at least one slide body and at least one roller body.

7. An apparatus as defined in claim 5, wherein said deflection member of said deflector is configured as a deflection edge.

8. An apparatus as defined in claim 7, wherein said deflection member is configured as an edge selected from the group consisting of a rib edge and a knife edge.

9. An apparatus as defined in claim 5, wherein said deflection member of said deflector is configured as a deflection roller.

10. An apparatus as defined in claim 5, wherein said deflector viewed along a deflected belt course, has at least one first deflection body spaced apart from said deflection member.

11. An apparatus as defined in claim 10, wherein a spacing between said deflection member and said at least one first deflection body is variable and settable.

12. An apparatus as defined in claim 11, wherein said at least one first deflection body is adjustable with regard to the spacing from said deflection member.

13. An apparatus as defined in claim 10, wherein said deflector base has a second deflection body which is adjacent to said deflection member and return said belt to its level and course.

14. An apparatus as defined in claim 13, wherein said second deflection body is adjustable together with said belt out of the belt level and the belt course.

15. An apparatus as defined in claim 14, wherein said second deflection body is adjustable together with said belt in a direction facing away from said at least one first deflection body.

16. An apparatus as defined in claim 1, wherein said device has a removable device for removing individual information carriers that have been removed from said belt.

17. An apparatus as defined in claim 16, wherein said removal device is configured so that at least some selected information carriers from which said belt removes itself as a consequence of a belt deflection, are deflected and transported out of a region of said belt.

18. An apparatus as defined in claim 16, wherein said removal device has an action device selected from the group consisting of a suction device, a pressure device, and both and operative for subjecting the information carriers to an action selected from the group consisting of suction, pressure and both and transporting them away.

19. An apparatus as defined in claim 18, wherein said action device has at least one drum which is located adjacent to said belt and, with a circumferential portion, approximately in a region of a deflection member of a deflector of said at least one device or between said deflection member and a second deflection body, and is rotationally drivable in a direction of rotation corresponding to a belt travel direction.

20. An apparatus as defined in claim 19, wherein said at least one drum is rotationally drivable at an rpm corresponding to a belt travel speed.

21. An apparatus as defined in claim 19, wherein said drum on its circumferential surface is provided with openings which are in communication with chambers and by way of which, by means of subjection to gas, the action is exerted on individual information carriers.

22. An apparatus as defined in claim 21, wherein said drum is configured so that by means of subjection to air the action is exerted on individual information carriers.

23. An apparatus as defined in claim 21, wherein by said drum, by underpressure action when at least one chamber and at least one opening communicating with it in a corresponding circumferential region of said drum, a given information carrier is aspiratable and is removable from a belt region by a drum rotation.

24. An apparatus as defined in claim 19, wherein said drum has a nondeformable circumference and is configured solely for suction action and aspirating individual information carriers.

25. An apparatus as defined in claim 19, wherein said drum at least in a circumferential portion has a perforated flexible covering and is configured for both underpressure action and aspiration of given information carriers to be removed as well as for overpressure action and pressing those information carriers against said belt that have been detached by at least some surface regions from said belt but are not meant to be removed but instead to be pressed against said belt again.

26. An apparatus as defined in claim 25, wherein said perforated flexible covering of said drum is configured as a membrane.

27. An apparatus as defined in claim 25, wherein said drum is configured as a ring that is driven to revolve and is held and guided on a fixed supporting part.

28. An apparatus as defined in claim 27, wherein said supporting part has a cylindrical circumferential surface provided with circumferential conduits, with which chambers provided in said ring, via conduits opened to said circumferential conduits, are in communication and actable upon by a pressure selected from the group consisting of the underpressure, overpressure, and both.

29. An apparatus as defined in claim 28, wherein said circumferential conduits include a first circumferential conduit provided in said supporting part and extending over a great majority of a proportion of a circumference of said supporting part, and is acted upon only by underpressure for aspirating given information carriers, and another circumferential conduit extending over a remainder of the proportion over the circumference of said supporting part and acted upon selectively by underpressure or overpressure for pressing a given one of integrated circuits against said belt.

30. An apparatus as defined in 16, wherein said removal device is assigned a receiving device, to which information carriers that are picked up by said removal device are transferred.

31. An apparatus as defined in claim 30, wherein said receiving device has a cylinder comprising a material selected from the group consisting of paper and cardboard, which is pressed on its circumference against the circumference of a drum and onto which information carriers transported by said drum are transferred, which adhere to said cylinder.

32. An apparatus as defined in claim 31, wherein said receiving device is configured so that the information carriers transported by said drum are transferred onto said cylinder and adhere to said cylinder by their adhesive side on a back.

33. An apparatus for handling information carriers, comprising at least one longitudinally striplike belt which holds information carriers detachably and successively; and at least one device for detaching at least some information carriers from said belt, removing selected information carriers from the detached information carriers, and transferring other information carriers from the detached information carriers back onto said belt for being transported onwards, wherein said device has a deflector which deflects said belt out of its level and course and then at a spacing from that returns said belt to its level again, wherein said deflector has a deflection member which deflects said belt out of the belt level and belt course by an angle that is sufficient such that as a consequence of a belt deflection, said belt distances itself from the information carriers, at least partly detaching them, while the information carriers stay essentially at the belt level, wherein said deflection member of said deflector is configured as a deflection edge, and wherein said deflection member is configured as an edge selected from the group consisting of a rib edge and a knife edge.

34. An apparatus for handling information carriers, comprising at least one longitudinally striplike belt which holds information carriers detachably and successively; and at least one device for detaching at least some information carriers from said belt, removing selected information carriers from the detached information carriers, and transferring other information carriers from the detached information carriers back onto said belt for being transported onwards, wherein said device has a deflector which deflects said belt out of its level and course and then at a spacing from that returns said belt to its level again, wherein said deflector has a deflection member which deflects said belt out of the belt level and belt course by an angle that is sufficient such that as a consequence of a belt deflection, said belt distances itself from the information carriers, at least partly detaching them, while the information carriers stay essentially at the belt level, wherein said deflector viewed along a deflected belt course, has at least one first deflection body spaced apart from said deflection member, wherein said deflector base has a second deflection body which is adjacent to said deflection member and return said belt to its level and course, and wherein said second deflection body is adjustable together with said belt out of the belt level and the belt course.

35. An apparatus for handling information carriers, comprising at least one longitudinally striplike belt which holds information carriers detachably and successively; and at least one device for detaching at least some information carriers from said belt, removing selected information carriers from the detached information carriers, and transferring other information carriers from the detached information carriers back onto said belt for being transported onwards, wherein said device has a removable device for removing individual information carriers that have been removed from said belt, and wherein said removal device is configured so that at least some selected information carriers from which said belt removes itself as a consequence of a belt deflection, are deflected and transported out of a region of said belt.

36. An apparatus as defined in claim 35, wherein said removal device has an action device selected from the group consisting of a suction device, a pressure device, and both and operative for subjecting the information carriers to an action selected from the group consisting of suction, pressure and both and transporting them away.

37. An apparatus as defined in claim 36, wherein said action device has at least one drum which is located adjacent to said belt and, with a circumferential portion, approximately in a region of a deflection member of a deflector of said at least one device or between said deflection member and a second deflection body, and is rotationally drivable in a direction of rotation corresponding to a belt travel direction.

38. An apparatus as defined in claim 37, wherein said at least one drum is rotationally drivable at an rpm corresponding to a belt travel speed.

39. An apparatus as defined in claim 37, wherein said drum on its circumferential surface is provided with openings which are in communication with chambers and by way of which, by means of subjection to gas, the action is exerted on individual information carriers.

40. An apparatus as defined in claim 39, wherein said drum is configured so that by means of subjection to air the action is exerted on individual information carriers.

41. An apparatus as defined in claim 39, wherein by said drum, by underpressure action when at least one chamber and at least one opening communicating with it in a corresponding circumferential region of said drum, a given information carrier is aspiratable and is removable from a belt region by a drum rotation.

42. An apparatus as defined in claim 37, wherein said drum has a nondeformable circumference and is configured solely for suction action and aspirating individual information carriers.

43. An apparatus as defined in claim 37, wherein said drum at least in a circumferential portion has a perforated flexible covering and is configured for both underpressure action and aspiration of given information carriers to be removed as well as for overpressure action and pressing those information carriers against said belt that have been detached by at least some surface regions from said belt but are not meant to be removed but instead to be pressed against said belt again.

44. An apparatus as defined in claim 43, wherein said perforated flexible covering of said drum is configured as a membrane.

45. An apparatus as defined in claim 43, wherein said drum is configured as a ring that is driven to revolve and is held and guided on a fixed supporting part.

46. An apparatus as defined in claim 45, wherein said supporting part has a cylindrical circumferential surface provided with circumferential conduits, with which chambers provided in said ring, via conduits opened to said circumferential conduits, are in communication and actable upon by a pressure selected from the group consisting of the underpressure, overpressure, and both.

47. An apparatus as defined in claim 46, wherein said circumferential conduits include a first circumferential conduit provided in said supporting part and extending over a great majority of a proportion of a circumference of said supporting part, and is acted upon only by underpressure for aspirating given information carriers, and another circumferential conduit extending over a remainder of the proportion over the circumference of said supporting part and acted upon selectively by underpressure or overpressure for pressing a given one of integrated circuits against said belt.

48. An apparatus as defined in 35, wherein said removal device is assigned a receiving device, to which information carriers that are picked up by said removal device are transferred.

49. An apparatus as defined in claim 48, wherein said receiving device has a cylinder comprising a material selected from the group consisting of paper and cardboard, which is pressed on its circumference against the circumference of a drum and onto which information carriers transported by said drum are transferred, which adhere to said cylinder.

50. An apparatus as defined in claim 49, wherein said receiving device is configured so that the information carriers transported by said drum are transferred onto said cylinder and adhere to said cylinder by their adhesive side on a back.

* * * * *